(12) United States Patent
Van Diepen

(10) Patent No.: US 10,017,227 B2
(45) Date of Patent: Jul. 10, 2018

(54) MINIMUM WAVE BOW

(71) Applicant: NaviForm Consulting & Research Ltd., Vancouver (CA)

(72) Inventor: Peter Van Diepen, Vancouver (CA)

( * ) Notice: Subject to any disclaimer, the term of this patent is extended or adjusted under 35 U.S.C. 154(b) by 0 days.

(21) Appl. No.: 15/377,832

(22) Filed: Dec. 13, 2016

(65) Prior Publication Data

US 2018/0162489 A1 Jun. 14, 2018

(51) Int. Cl.
*B63B 1/24* (2006.01)
*B63B 1/04* (2006.01)

(52) U.S. Cl.
CPC ............... *B63B 1/248* (2013.01); *B63B 1/04* (2013.01)

(58) Field of Classification Search
CPC .... B63B 1/00; B63B 1/10; B63B 1/16; B63B 1/24; B63B 1/26; B63B 1/38; B63B 3/00; B63B 35/32; B63B 35/44
USPC .......................... 114/271, 272, 274, 279, 288
See application file for complete search history.

(56) References Cited

U.S. PATENT DOCUMENTS

| | | | |
|---|---|---|---|
| 3,179,077 A * | 4/1965 | Loo ............................ | B63B 1/24 114/274 |
| 3,742,888 A | 7/1973 | Crowley | |
| 3,768,429 A * | 10/1973 | Greer ......................... | B63B 1/38 114/274 |
| 3,842,772 A | 10/1974 | Lang | |
| 5,191,848 A | 3/1993 | Hatfield | |
| 5,570,649 A | 11/1996 | Austin | |
| 6,085,677 A | 7/2000 | Bell | |
| 6,250,245 B1 | 6/2001 | Robinson et al. | |
| 6,526,903 B2 | 3/2003 | Robinson et al. | |
| 7,422,498 B2 | 9/2008 | Burg | |
| 7,458,327 B1 | 12/2008 | Dunkerson | |
| 7,631,609 B1 * | 12/2009 | Konstantinovskiy ..... | B63B 1/24 114/271 |
| 7,685,958 B2 * | 3/2010 | Wulf ......................... | B63B 1/06 114/288 |
| 2010/0089303 A1 * | 4/2010 | Sioutis ...................... | B63B 1/24 114/279 |
| 2013/0192505 A1 | 8/2013 | Dinham-Peren | |

FOREIGN PATENT DOCUMENTS

| | | |
|---|---|---|
| CA | 2331366 | 11/1999 |
| WO | 2013162474 | 10/2013 |

* cited by examiner

*Primary Examiner* — Lars A Olson
(74) *Attorney, Agent, or Firm* — Richard D. Okimaw

(57) ABSTRACT

A ship hull comprises a main hull portion having a bottom extending along a centerline from a leading edge, having first and second sides and having a top surface and an inclined leading surface. The ship hull further comprises first and second side skegs extending along the first and second sides of the main hull portion from the leading edge thereof, each of the first and second side skegs having outside and inside surfaces and extending to a bottom surface below the leading surface. A foil located between the first and second side skegs extends between first and second ends at a position below the leading surface. The leading surface of the main hull portion joins with the bottom surface of the first and second side skegs at a transition location forming a single continuous bottom surface aft thereof.

17 Claims, 5 Drawing Sheets

MINIMUM WAVE BOW

BACKGROUND OF THE INVENTION

1. Field of Invention

The present invention relates generally to marine vessel hulls and in particular to a hull design for reduction of bow waves.

2. Description of Related Art

When a marine vessel moves through water, it displaces the water and creates wake, or waves, which propagate outwards in a V-shape trailing from the vessel. The shape of the hull, and in particular the bow shape, corresponds to the vessel efficiency, which is related to the energy required to propel the vessel through the water, with a proportion of the energy dissipated as waves. By reducing the waves produced, efficiency can be increased, and therefore fuel consumption can be decreased.

In some jurisdictions, wake is not permitted as the waves can interfere with other marine operations, such as moorage facilities or locations where individuals are working at the water level, for example, on floats or logs. Additionally, wake may be discouraged in areas where shore erosion is a concern, as wave action contributes to such erosion. In these cases, vessels must decrease their speed to the slowest speed necessary to maintain maneuverability while eliminating waves.

Typically, the most common bow design of a single hull marine vessel is a narrow bow relative to the remainder of the hull, which effectively comes to a point at the leading edge. This shape of bow is typical of the individual hulls on multihull vessels, as well. All such bow designs generate wake at speed. One method to reduce such wake is to include a protruding bulb at the bow, which modifies the way the water flows around the hull. A disadvantage of a narrow bow is decreased cargo capacity at the leading edge of the vessel, which remains an issue with the bulbous bow, as well.

SUMMARY OF THE INVENTION

According to a first embodiment of the present invention there is disclosed a ship hull comprising a main hull portion having a bottom extending along a centerline from a leading edge, having first and second sides and having a top surface and an inclined leading surface. The ship hull further comprises first and second side skegs extending along the first and second sides of the main hull portion from the leading edge thereof, each of the first and second side skegs having outside and inside surfaces and extending to a bottom surface below the leading surface. A foil located between the the first and second side skegs extends between first and second ends at a position below the leading surface. The leading surface of the main hull portion joins with the bottom surface of the first and second side skegs at a transition location forming a single continuous bottom surface aft thereof.

The first and second side skegs may be continuous with the first and second sides of the main hull portion. The leading surface of the main hull portion may include a stem portion extending along the centerline. The stem portion may extend between the leading edge and the transition location at a rake angle selected to be between 60 and 75 degrees from vertical. The stem portion may have a radius proximate to the transition location so as to smoothly transition the stem portion to the bottom of the main hull portion.

The outside surfaces of the first and second side skegs may be substantially vertical. The outside surfaces of the first and second side skegs may be substantially parallel. The inside surfaces of the first and second side skegs may be substantially vertical. The inside surfaces of the first and second side skegs may taper at a taper angle selected to be between 0 and 25 degrees toward the leading edge.

The foil may include an angle of attack selected to be between 0 and 10 degrees. The foil may include a convex top surface. The foil may include a concave bottom surface. The foil may include a flat bottom surface. The foil may be positioned below the waterline when in operation. The foil may be inclined upward at a dihedral angle in a direction from the first and second side skegs towards the centerline at an inclination angle selected to be between 0 and 15 degrees. The foil may be declined downward at an anhedral angle in a direction from the first and second side skegs towards the centerline at an inclination angle selected to be between 0 and 15 degrees. The foil may extend substantially straight between the first and second ends. The foil may sweep towards the leading edge of the main hull portion toward the centerline with a sweep angle selected to be between 0 and 30 degrees. The foil may sweep away from the leading edge of the main hull portion toward the centerline with a sweep angle selected to be between 0 and 30 degrees. The first and second ends of the foil may extend to the first and second side skegs.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
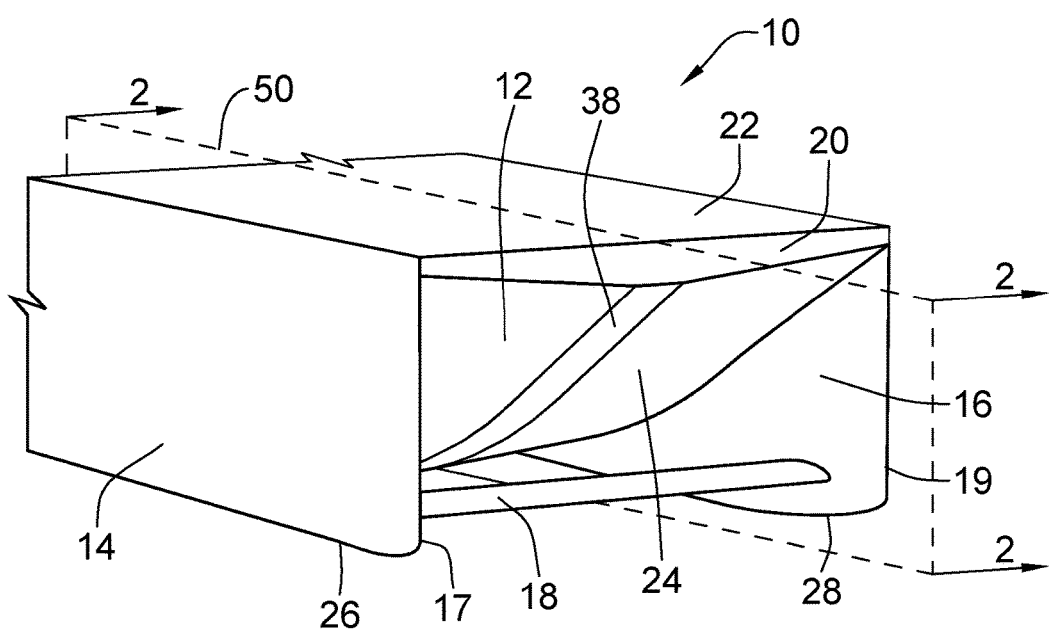
FIG. 1 is a perspective view of a ship hull according to a first embodiment of the present invention.

Referring to FIG. 1, a ship hull according to a first embodiment of the invention is shown generally at 10. The hull 10 comprises a main hull portion 12 with first and second side skegs, 14 and 16, respectively. The first (starboard) and second (port) side skegs, 14 and 16, are connected to the sides of the main hull portion 12 with a substantially horizontal foil 18 therebetween.

Figure 3:
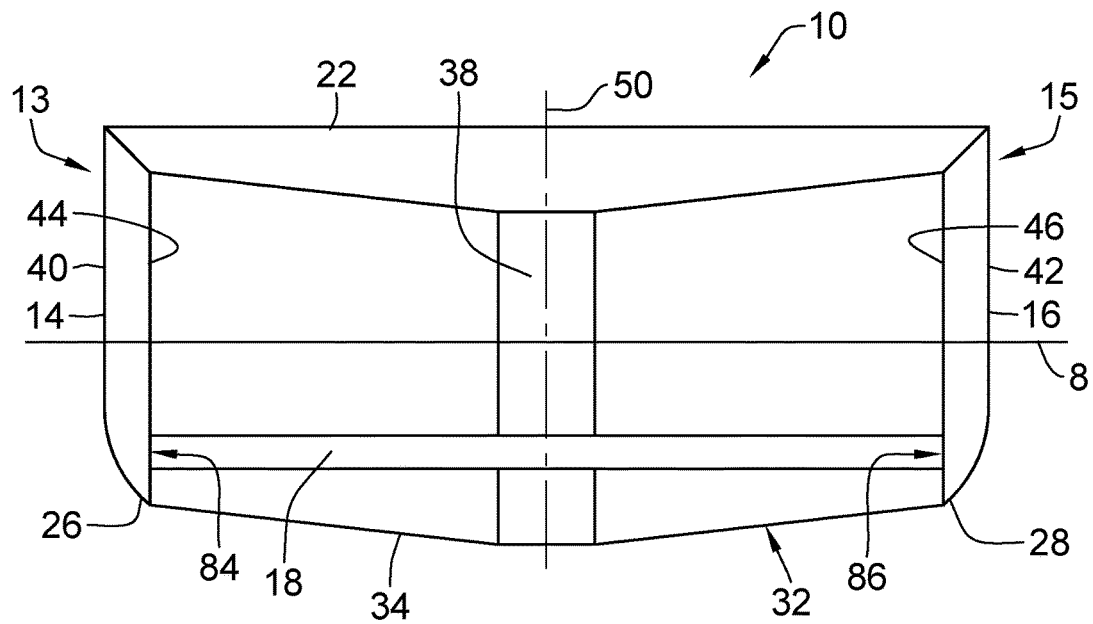
FIG. 3 is a front view of the ship hull of FIG. 1.
Figure 4:
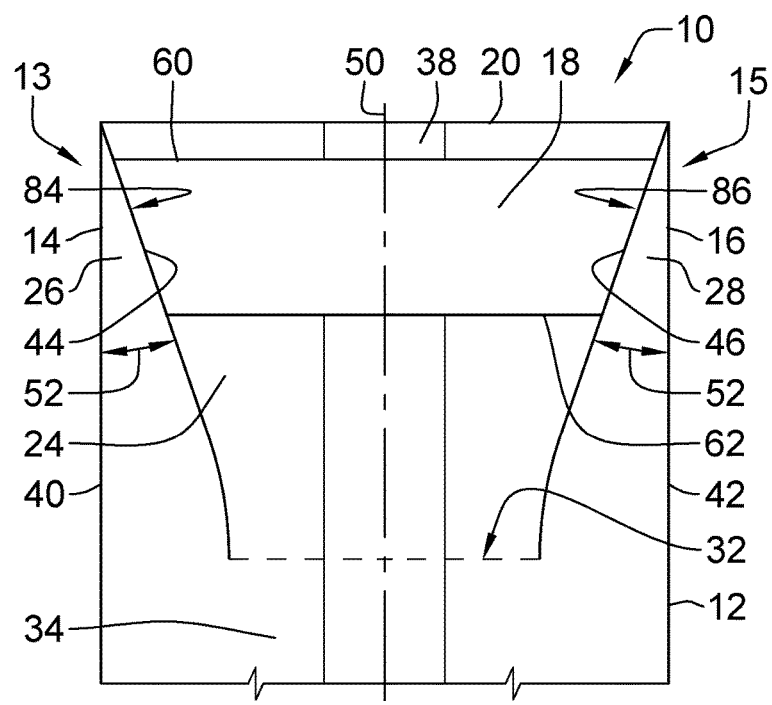
FIG. 4 is a bottom plan view of the ship hull of FIG. 1.

The main hull portion 12 extends along a centerline 50 (as shown in FIGS. 3 and 4) between a leading edge 20 and a trailing edge (not shown), and between first and second sides 13 and 15, respectively. Although the bow of the ship hull 10 is discussed further below, it will be appreciated that the stern may be of any configuration and the ship hull may have any length as needed for the intended use. Similarly, the first and second side skegs, 14 and 16, extend between the leading edge 20 and a transition location, which will be set out below. The first side skeg 14 extends along the first side 13, and the second side skeg 16 extends along the second side 15. Proximate to the leading edge 20, the first and second side skeg stems, 17 and 19, respectively, may be vertical as illustrated, although it will be appreciated that they may be sloped towards the stern, as well. Proximate to the leading edge 20, the main hull portion 12 extends between the top surface 22 and leading surface 24. The leading surface 24 may be sloped and curved, as will be set out below.

The first and second side skegs, 14 and 16, extend between the top surface 22 and bottom surfaces 26 and 28, respectively. At a transition location along the length of the hull 10, generally indicated at 32 in FIGS. 2 and 4, the first and second side skegs 14 and 16 are joined with the main hull portion 12, such that the surfaces 24, 26 and 28 all align to form a single continuous bottom surface 34. First and second side skegs 14 and 16 may be co-formed with the main hull portion 12, or they may be formed separately and secured to the main hull portion 12. As shown in FIG. 3, the bottom surface 34 may be sloped downwards between the first and second side skegs 14 and 16 to the hull centerline 50 at an angle commonly known as deadrise. It will be appreciated that the bottom surface 34 may be substantially horizontal, as well, although in such industries a perfect horizontal surface is difficult to produce, and often a near horizontal surface will be provided.

Figure 2:
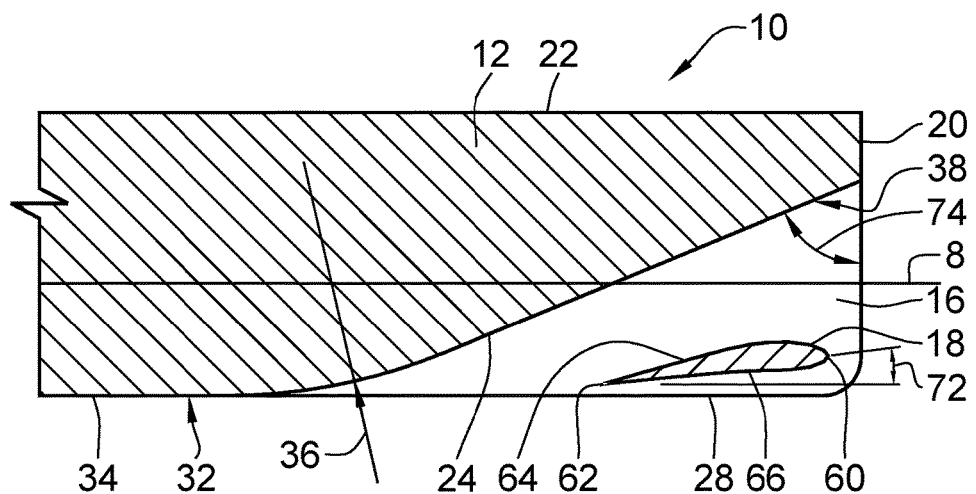
FIG. 2 is a cross sectional side view of the ship hull of FIG. 1 taken along the plane 2-2.

As shown in FIGS. 1, 3 and 4, the main hull portion 12 may include a stem portion 38, as is commonly known, extending along the hull centerline 50 of the main hull portion 12 from the leading edge 20 to the transition location 32. Referring to FIG. 2, the stem portion 38 may be sloped downwards from the leading edge 20 with a rake angle 74 in the range of 60 to 75 degrees from vertical and may be formed with a transition bow radius 36 proximate to the transition location 32 to provide a smooth transition to the bottom surface 34 of the main hull portion. It will be appreciated that in such industries, a perfect radius bend is difficult and often a near radial curvature will be provided.

Turning now to FIGS. 3 and 4, the first and second side skegs 14 and 16 extend between outside surfaces, 40 and 42, respectively, and inside surfaces, 44 and 46, respectively. The outside surfaces, 40 and 42, may be parallel and substantially vertical. The inside surfaces, 44 and 46, may taper inwards towards the hull centerline 50 from a point at the leading edge 20 to the transition location 32 with a side skeg taper angle 52, as shown on FIG. 4. The side skeg taper angle 52 may be in the range of 0 to 25 degrees.

The foil 18 extends between first and second ends, 84 and 86, respectively, as shown in FIG. 3. The first and second ends, 84 and 86, may fully extend to the inside surfaces 44 and 46, respectively, proximate to the leading edge 20, so as to be positioned below the waterline 8 when in operation. As shown on FIG. 2, the foil 18 extends between leading and trailing edges 60 and 62, respectively, and between top and bottom surfaces, 64 and 66, respectively. The top surface 64 may be convex, while the bottom surface 66 may be concave or substantially flat. Optionally, the foil 18 may be other shapes as are commonly known. The foil 18 may be installed with an angle of attack 72 such as in the range of 0 to 10 degrees.

Figure 5:
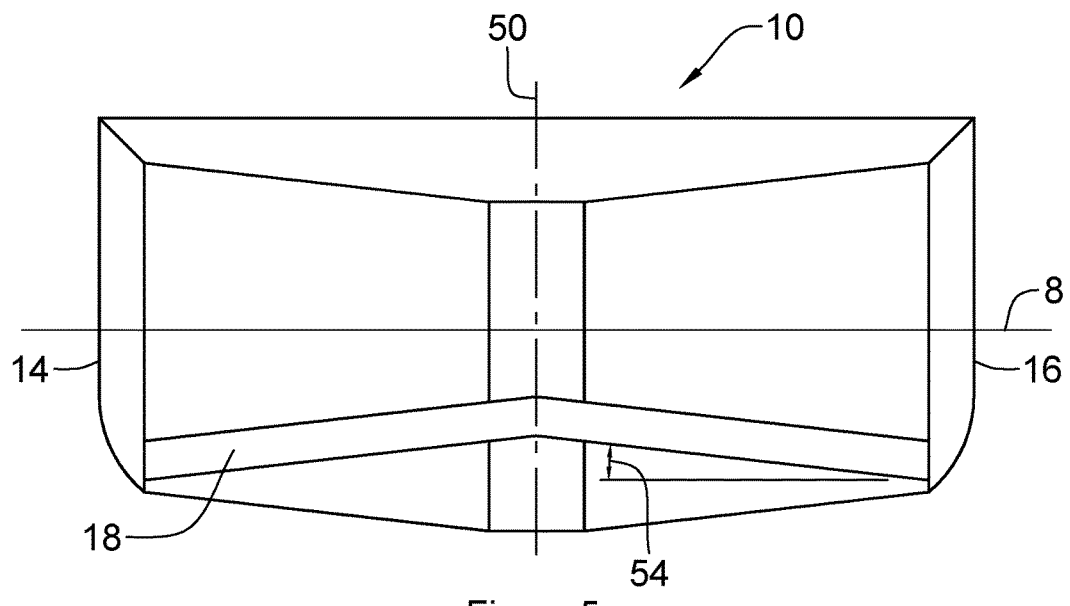
FIG. 5 is a front view of the ship hull of FIG. 1 according to a further embodiment.
Figure 6:
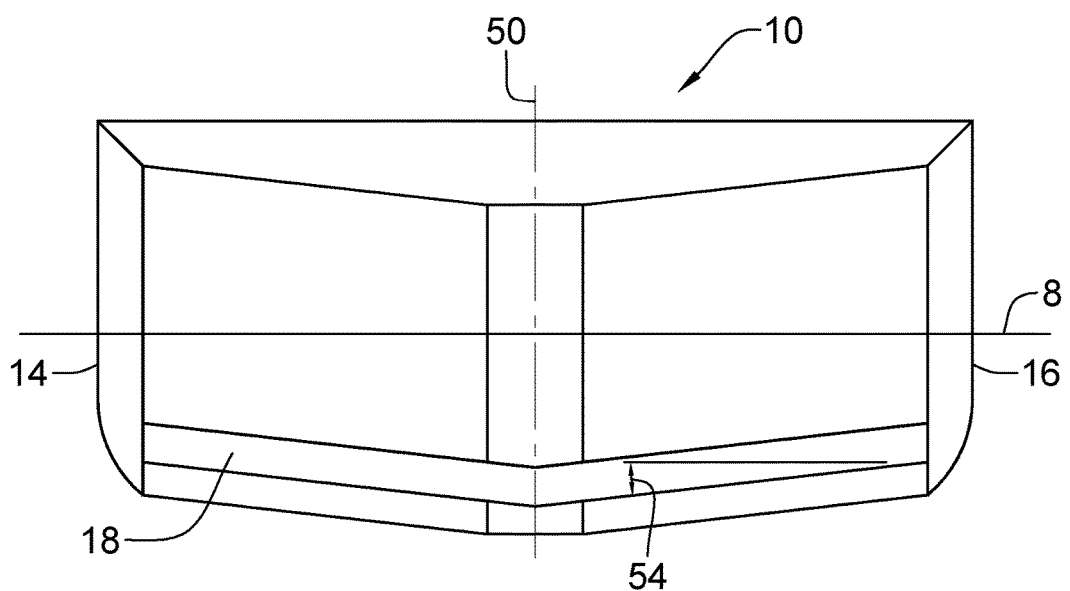
FIG. 6 is a front view of the ship hull of FIG. 1 according to a further embodiment.

Referring now to FIGS. 5 and 6, further embodiments of the invention are illustrated. In FIG. 5 the foil 18 may be upward inclined towards the waterline 8 from the first and second side skegs 14 and 16 to the hull centerline 50 in a dihedral configuration at a foil inclination angle 54 such as in the range of 0 to 15 degrees, while FIG. 6 illustrates the foil 18 downward inclined away from the waterline 8 in an anhedral configuration at a foil inclination angle 54 such as in the range of 0 to 15 degrees. Although FIGS. 5 and 6 illustrate the entire foil inclined at a foil inclination angle 54, it will be appreciated that any portion thereof may be inclined.

Figure 7:
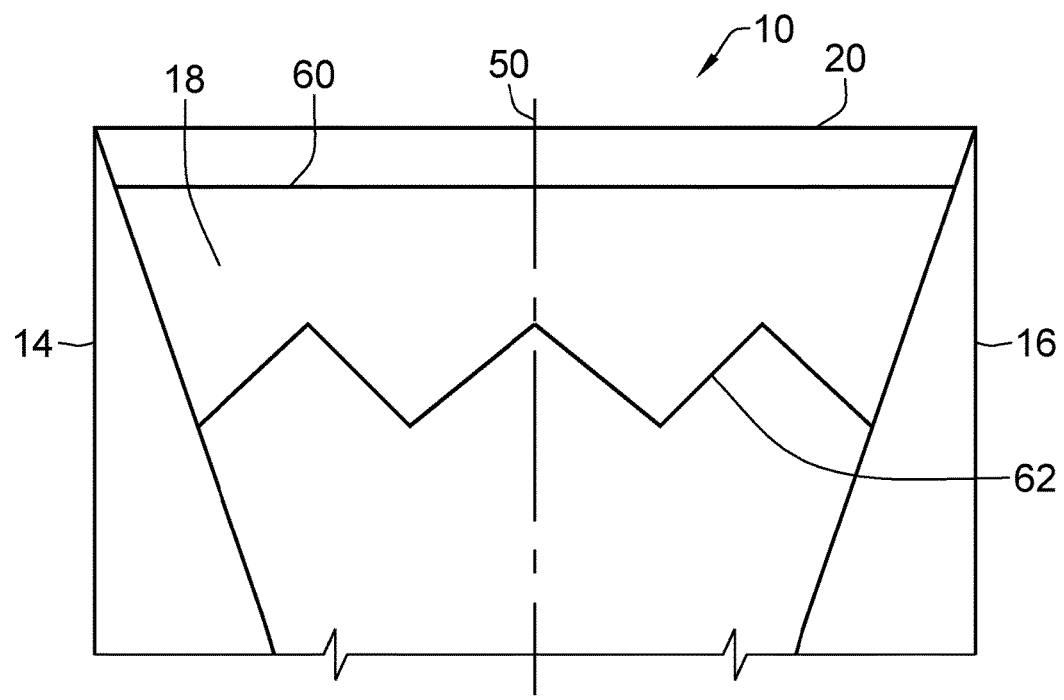
FIG. 7 is a bottom plan view of the ship hull of FIG. 1 according to a further embodiment.
Figure 8:
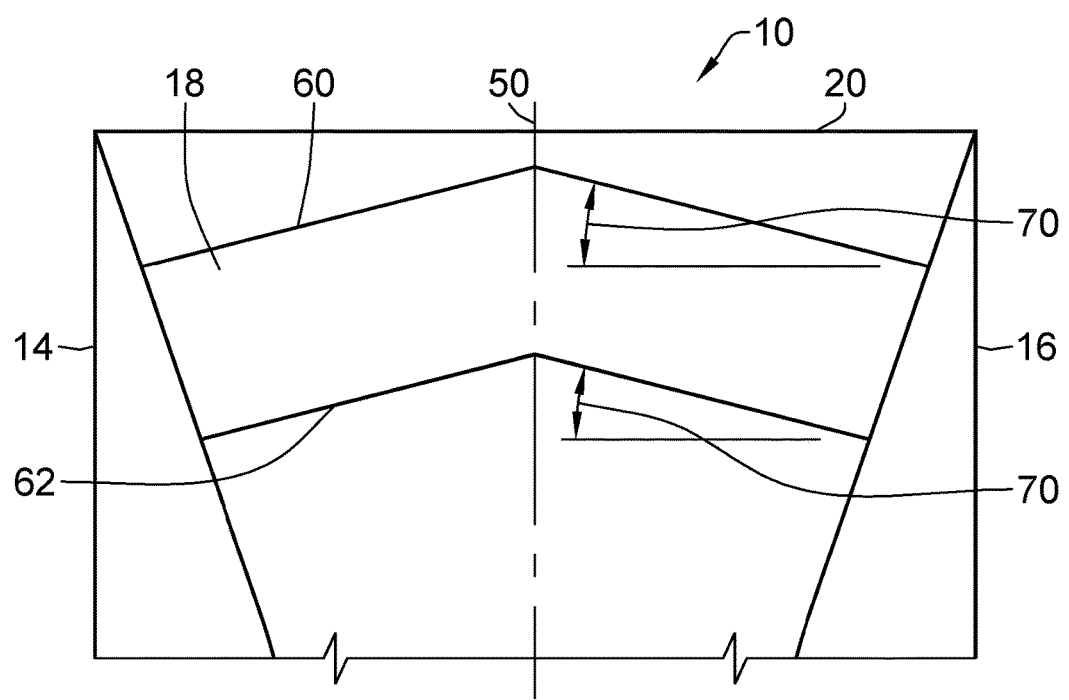
FIG. 8 is a bottom plan view of the ship hull of FIG. 1 according to a further embodiment.
Figure 9:
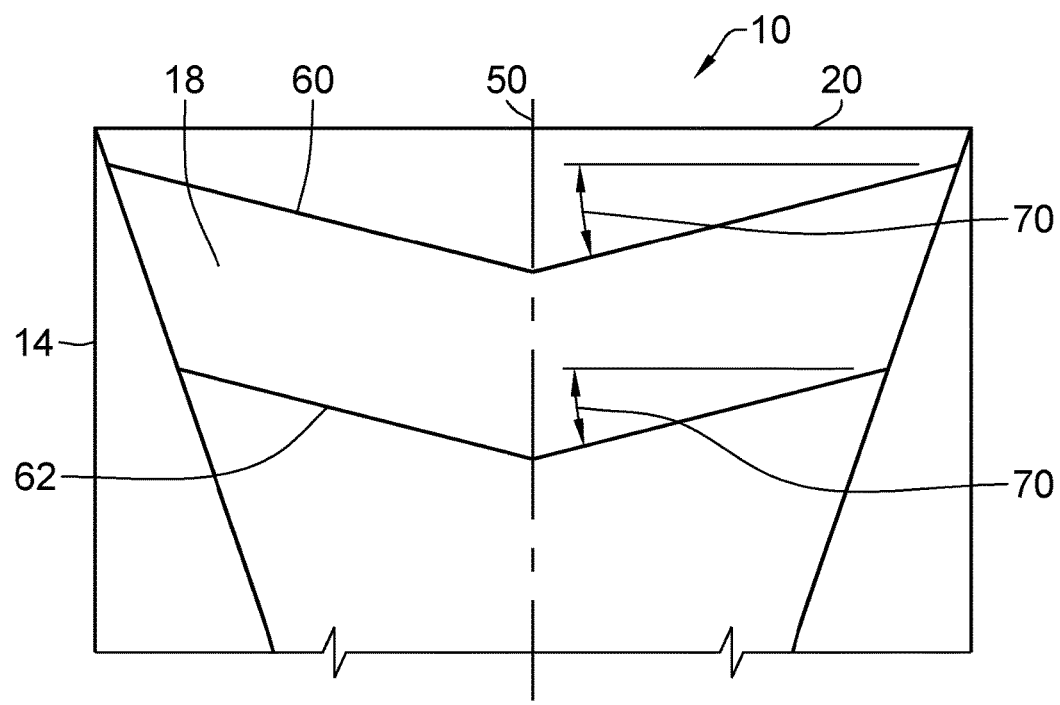
FIG. 9 is a bottom plan view of the ship hull of FIG. 1 according to a further embodiment.

Turning now to FIGS. 7, 8 and 9, further embodiments of the invention are illustrated with various foil 18 configurations. The leading edge 60 of the foil 18 may be substantially straight between the first and second side skegs 14 and 16, as illustrated in FIGS. 4 and 6, or the foil 18 may sweep towards the leading edge 20 of the hull 10 at a sweep angle 70 such as in the range of 0 to 30 degrees, as illustrated in FIG. 8, or foil 18 may sweep away from the leading edge 20 of the hull 10 at a sweep angle 70, such as in the range of 0 to 30 degrees, as illustrated in FIG. 9. The foil 18 may have a constant width between the leading edge 60 and the trailing edge 62 such that the sweep angle 70 at the leading edge 60 is the same as at the trailing edge 62, or the distance may vary, as illustrated in FIG. 7. It may be appreciated that the trailing edge 62 may include any other profile, as well.

Figure 10:
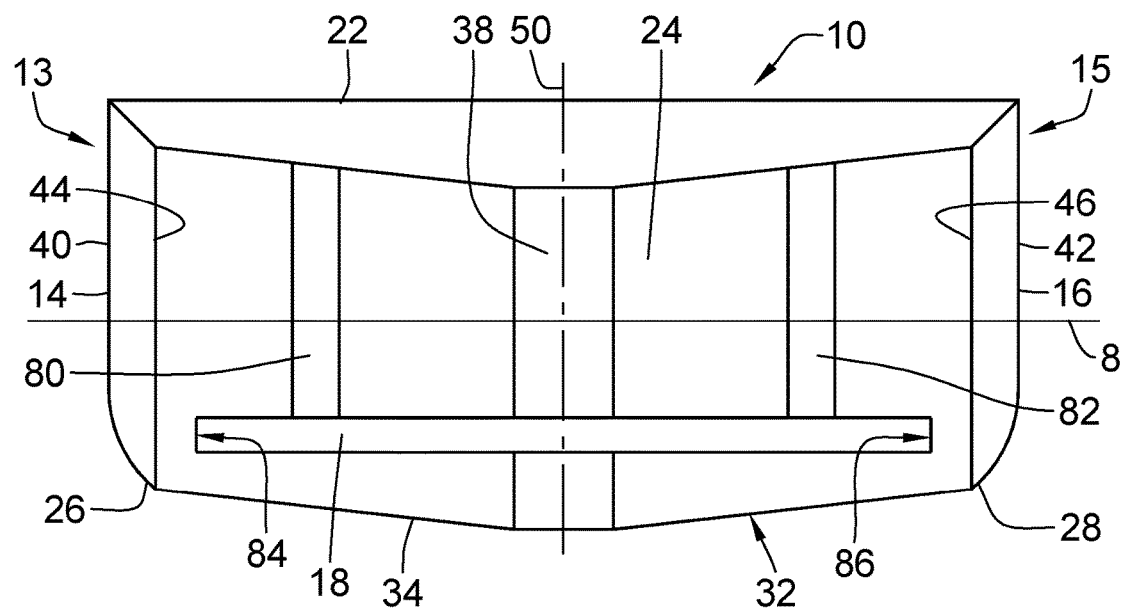
FIG. 10 is a front view of the ship hull of FIG. 1 according to a further embodiment.

It will be appreciated that the foil 18 may be supported by other structures, as well. By way of illustration, FIG. 10 shows a further embodiment wherein the foil 18 is supported by first and second vertical struts, 80 and 82, respectively. In this embodiment, the first and second ends 84 and 86 of the foil 18 may be spaced apart from the first and second side skegs, 14 and 16. The first and second vertical struts, 80 and 82, may extend from the leading surface 24 of the main hull 12 at any location thereon.

In operation, the first and second side skegs 14 and 16 prevent the bow wave from propagating outwards along the hull 10, instead forcing the flow under the hull 10. The foil 18 generates a negative pressure area, before the main hull portion 12 produces the opposite effect, thereby reducing overall resistance of the hull at speed.

While specific embodiments of the invention have been described and illustrated, such embodiments should be considered illustrative of the invention only and not as limiting the invention as construed in accordance with the accompanying claims.

What is claimed is:

1. A ship hull comprising:
    a main hull portion having a bottom extending along a centerline from a leading edge, said main hull portion extending between first and second sides and having and an inclined leading surface;
    first and second side skegs extending along said first and second sides of said main hull portion from said leading edge thereof, each of said first and second side skegs having outside and inside surfaces and extending to a bottom surface below said leading surface, wherein said inside surfaces of said first and second side skegs taper at a taper angle selected to be between 0 and 25 degrees toward said leading edge;
    a foil located between said first and second side skegs, said foil extending between first and second ends at a position below said leading surface;

wherein said leading surface of said main hull portion joins with said bottom surface of said first and second side skegs at a transition location forming a single continuous bottom surface aft thereof, wherein said leading surface of said main hull portion includes a stem portion extending along said centerline between said leading edge and said transition location at a rake angle selected to be between 60 and 70 degrees from vertical.

2. The apparatus of claim 1 wherein said first and second side skegs are continuous with said first and second sides of said main hull portion.

3. The apparatus of claim 1 wherein said stem portion has a radius proximate to said transition location so as to smoothly transition said stem portion to said bottom of said main hull portion.

4. The apparatus of claim 1 wherein said outside surfaces of said first and second side skegs are substantially vertical.

5. The apparatus of claim 4 wherein said outside surfaces of said first and second side skegs are substantially parallel.

6. The apparatus of claim 1 wherein said inside surfaces of said first and second side skegs are substantially vertical.

7. The apparatus of claim 1 wherein said foil includes an angle of attack selected to be between 0 and 10 degrees.

8. The apparatus of claim 1 wherein said foil includes a convex top surface.

9. The apparatus of claim 1 wherein said foil includes a concave bottom surface.

10. The apparatus of claim 1 wherein said foil includes a flat bottom surface.

11. The apparatus of claim 1 wherein said foil is positioned below the waterline when in operation.

12. The apparatus of claim 1 wherein said foil is inclined upward at a dihedral angle in a direction from said first and second side skegs towards said centerline at an inclination angle selected to be between 0 and 15 degrees.

13. The apparatus of claim 1 wherein said foil is declined downward at an anhedral angle in a direction from said first and second side skegs towards said centerline at an inclination angle selected to be between 0 and 15 degrees.

14. The apparatus of claim 1 wherein said foil extends substantially straight between said first and second ends.

15. The apparatus of claim 1 wherein said foil sweeps towards said leading edge of said main hull portion toward said centerline with a sweep angle selected to be between 0 and 30 degrees.

16. The apparatus of claim 1 wherein said foil sweeps away from said leading edge of said main hull portion toward said centerline with a sweep angle selected to be between 0 and 30 degrees.

17. The apparatus of claim 1 wherein said first and second ends of said foil extend to said inside surfaces of said first and second side skegs.

* * * * *